(12) United States Patent
Zhang

(10) Patent No.: US 12,521,554 B2
(45) Date of Patent: Jan. 13, 2026

(54) SYSTEMS AND METHODS FOR AUTOMATIC SUB-PERCEPTION PARAMETER SELECTION

(71) Applicant: Boston Scientific Neuromodulation Corporation, Valencia, CA (US)

(72) Inventor: Tianhe Zhang, Studio City, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 413 days.

(21) Appl. No.: 18/095,233

(22) Filed: Jan. 10, 2023

(65) Prior Publication Data

US 2023/0226354 A1   Jul. 20, 2023

Related U.S. Application Data

(60) Provisional application No. 63/299,458, filed on Jan. 14, 2022.

(51) Int. Cl.
| | |
|---|---|
| *A61N 1/36* | (2006.01) |
| *A61B 5/00* | (2006.01) |
| *A61B 5/279* | (2021.01) |

(52) U.S. Cl.
CPC ............ *A61N 1/3605* (2013.01); *A61B 5/279* (2021.01); *A61B 5/7264* (2013.01); *A61B 5/0002* (2013.01)

(58) Field of Classification Search
CPC ................ A61N 1/0551; A61N 1/0553; A61N 1/36185; A61N 1/36128; A61N 1/36031
See application file for complete search history.

(56) References Cited

U.S. PATENT DOCUMENTS

| | | |
|---|---|---|
| 6,181,969 B1 | 1/2001 | Gord |
| 6,516,227 B1 | 2/2003 | Meadows et al. |
| 6,609,029 B1 | 8/2003 | Mann et al. |

(Continued)

FOREIGN PATENT DOCUMENTS

WO   WO-2023137009 A1   7/2023

OTHER PUBLICATIONS

"Australian Application Serial No. 2023206879, First Examination Report mailed Apr. 9, 2025", 3 pgs.

(Continued)

*Primary Examiner* — Alyssa M Alter
(74) *Attorney, Agent, or Firm* — Schwegman Lundberg & Woessner, P.A.

(57) ABSTRACT

A method of controlling operation of a neurostimulation device comprises receiving, by the neurostimulation device, an indication of a physiological search area of a subject for delivering electrical neurostimulation and a prioritized search list of neurostimulation parameters for neurostimulation therapy delivered to the search area; delivering the neurostimulation therapy to the search area and varying the neurostimulation parameters according to the parameter priority, wherein a highest priority parameter is varied first while lower priority parameters are held constant; determining the optimum value of the highest priority parameter; delivering neurostimulation to the search area using the determined optimum value of the highest priority parameter and varying one or more lower priority parameters according to the parameter priority; and determining optimum lower priority parameters for the neurostimulation.

19 Claims, 10 Drawing Sheets

(56) References Cited

U.S. PATENT DOCUMENTS

| | | |
|---|---|---|
| 6,609,032 B1 | 8/2003 | Woods et al. |
| 6,741,892 B1 | 5/2004 | Meadows et al. |
| 6,895,280 B2 | 5/2005 | Meadows et al. |
| 7,244,150 B1 | 7/2007 | Brase et al. |
| 7,519,431 B2 | 4/2009 | Goetz et al. |
| 7,672,734 B2 | 3/2010 | Anderson et al. |
| 7,761,165 B1 | 7/2010 | He et al. |
| 7,949,395 B2 | 5/2011 | Kuzma |
| 7,974,706 B2 | 7/2011 | Moffitt et al. |
| 8,082,034 B2 | 12/2011 | Keacher |
| 8,175,710 B2 | 5/2012 | He |
| 8,224,450 B2 | 7/2012 | Brase |
| 8,364,278 B2 | 1/2013 | Pianca et al. |
| 8,700,178 B2 | 4/2014 | Anderson |
| 10,850,101 B2 | 12/2020 | Zhang et al. |
| 2007/0203543 A1 | 8/2007 | Stone et al. |
| 2007/0265664 A1* | 11/2007 | Gerber ............... A61N 1/36071 607/2 |
| 2020/0147388 A1 | 5/2020 | Huertas Fernandez et al. |
| 2020/0254256 A1 | 8/2020 | Moffitt et al. |
| 2021/0046314 A1 | 2/2021 | Doan et al. |

OTHER PUBLICATIONS

"European Application Serial No. 23705109.9, Communication Pursuant to Article 94(3) EPC mailed Jun. 13, 2025", 5 pgs.

"European Application Serial No. 23705109.9, Response to Communication pursuant to Rules 161 and 162 EPC filed Feb. 13, 2025", 11 pgs.

"International Application Serial No. PCT/US2023/010470, International Preliminary Report on Patentability mailed Jul. 25, 2024", 9 pgs.

"International Application Serial No. PCT/US2023/010470, International Search Report mailed Apr. 12, 2023", 4 pgs.

"International Application Serial No. PCT/US2023/010470, Written Opinion mailed Apr. 12, 2023", 7 pgs.

* cited by examiner

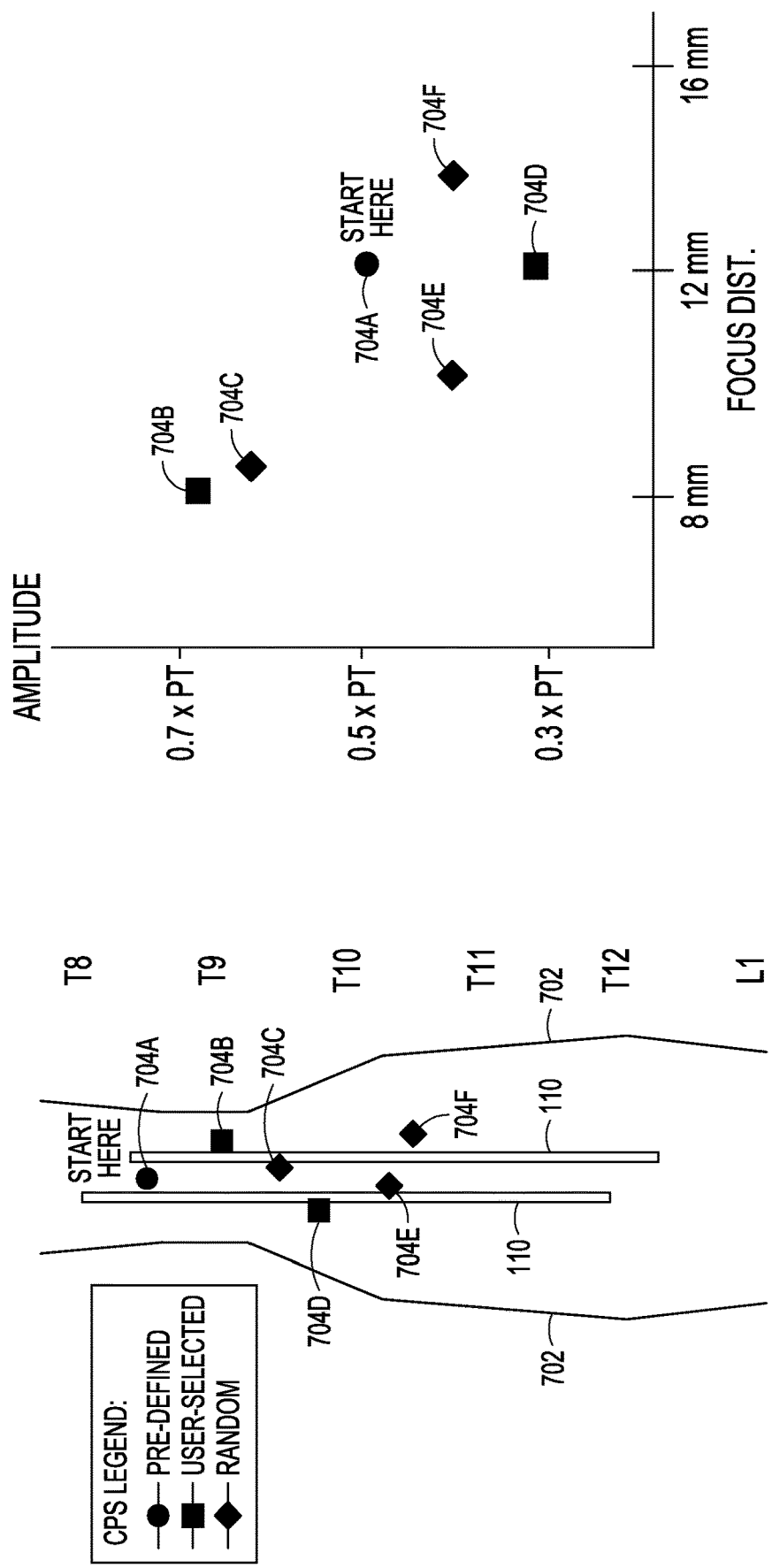

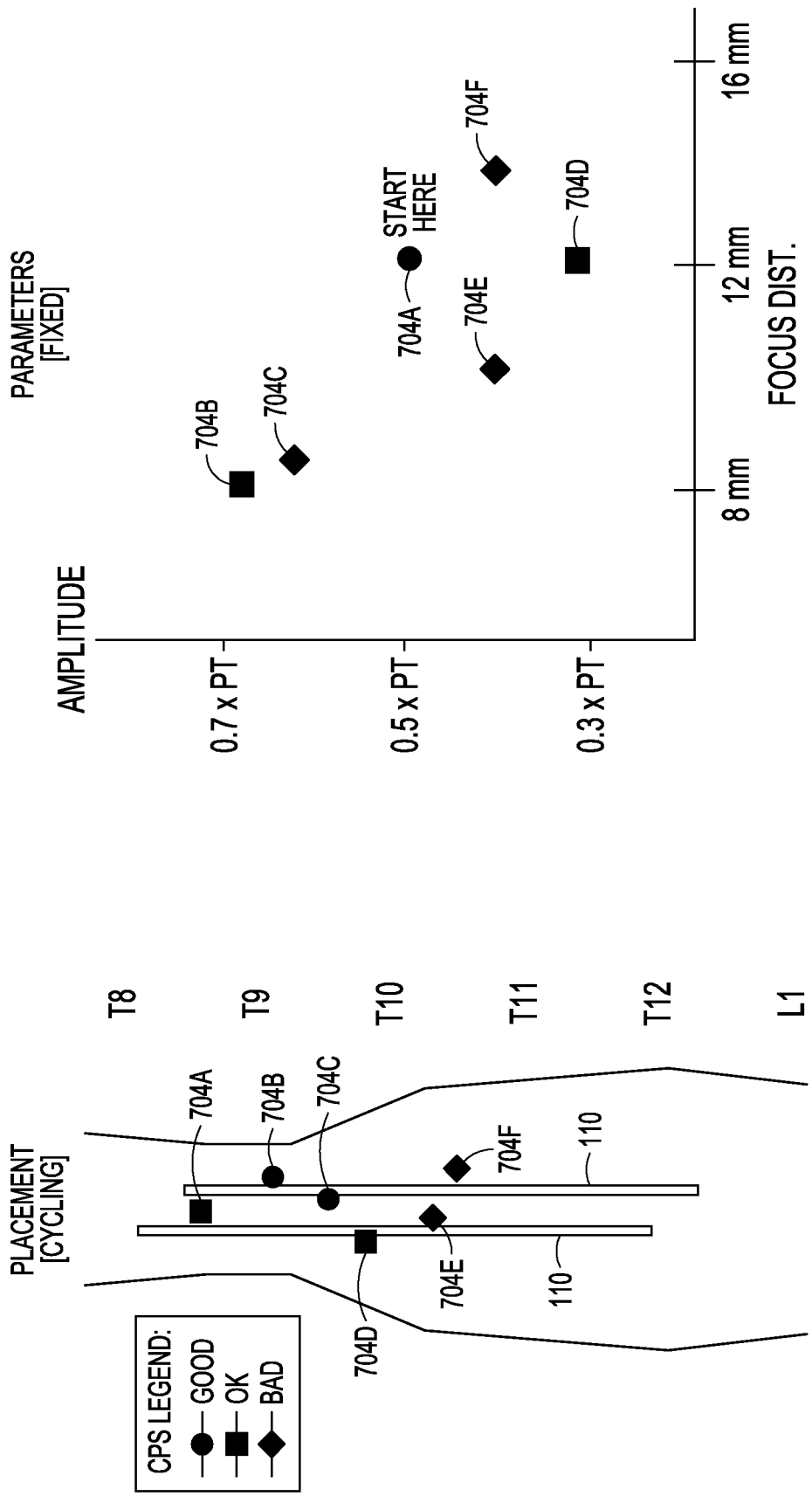

SYSTEMS AND METHODS FOR AUTOMATIC SUB-PERCEPTION PARAMETER SELECTION

CLAIM OF PRIORITY

This application claims the benefit of U.S. Provisional Application No. 63/299,458, filed on Jan. 14, 2022, which is hereby incorporated by reference in its entirety.

TECHNICAL FIELD

This document relates generally to medical devices and more particularly to systems and methods for neurostimulation.

BACKGROUND

Neurostimulation, also referred to as neuromodulation, has been proposed as a therapy for a number of conditions. Examples of neurostimulation include Spinal Cord Stimulation (SCS), Deep Brain Stimulation (DBS), Peripheral Nerve Stimulation (PNS), Nerve Root Stimulation (NRS), and Functional Electrical Stimulation (FES). Implantable neurostimulation systems have been applied to deliver such a therapy. An implantable neurostimulation system may include an implantable neurostimulator, also referred to as an implantable pulse generator (IPG), and one or more implantable leads each including one or more electrodes. The implantable neurostimulator delivers neurostimulation energy through one or more electrodes placed on or near a target site in the nervous system. An external programming device can be used to program the implantable neurostimulator with stimulation parameters controlling the delivery of the neurostimulation energy.

In one example, the neurostimulation energy is delivered in the form of electrical neurostimulation pulses. The delivery is controlled using stimulation parameters that specify spatial (where to stimulate), temporal (when to stimulate), and informational (patterns of pulses directing the nervous system to respond as desired) aspects of a pattern of neurostimulation pulses. Neurostimulation systems may offer many programmable options for the parameters of the neurostimulation to customize the neurostimulation therapy for a specific patient. For some types of neurostimulation (e.g., SCS) the efficacy of the neurostimulation for the patient may depend on an intricate balance of stimulation location coupled with the programmed stimulation waveform. However, the number of programmable options can create an extensive parameter search space for the physician or clinician. Finding the optimal neurostimulation parameters may take a lot of time in the clinic for both the clinic staff and the patient.

SUMMARY

Electrical neurostimulation energy can be delivered in the form of electrical neurostimulation pulses. These pulses may be provided in patterns of pulses sometimes referred to as patterned neurostimulation. The parameters of the neurostimulation can be programmable to provide many different stimulation patterns as well as different geometries of the neurostimulation (e.g., location, area of the stimulation, etc.). While the many available programming parameters allow for many neurostimulation options for a patient, the many parameters create a large parameter search space. Searching parameters to find the right combination of spatiotemporal settings for the neurostimulation can be daunting for the clinician or physician if the search for the right combination of parameters involves testing the effect on the patient of one parameter at a time. The embodiments described herein provide an automatic streamlined searching method to find the optimum setting for a particular patient.

Example 1 includes subject matter (such as a machine-implemented method of controlling operation of a neurostimulation device) comprising receiving, by the neurostimulation device, an indication of a physiological search area of a subject for delivering electrical neurostimulation and a prioritized search list of neurostimulation parameters for neurostimulation therapy delivered to the search area; delivering the neurostimulation therapy to the search area and varying the neurostimulation parameters according to parameter priority of the search list, wherein a highest priority parameter is varied first while lower priority parameters are held constant; determining the optimum value of the highest priority parameter; delivering neurostimulation to the search area using the determined optimum value of the highest priority parameter and varying one or more lower priority parameters according to the parameter priority; and determining optimum lower priority parameters for the neurostimulation.

In Example 2, the subject matter of Example 1 optionally includes the highest priority parameter being stimulation site, and the stimulation site is varied first while lower order priority parameters are held constant. The delivering the neurostimulation within the search area optionally includes applying the neurostimulation in turn to multiple stimulation sites within the search area while holding lower priority parameters constant; and delivering the neurostimulation to one or more determined optimum stimulation sites and varying the one or more lower priority parameters according to the parameter priority.

In Example 3, the subject matter of Example 2 optionally includes recurrently applying the neurostimulation in turn to the multiple stimulation sites within the search area, which includes determining efficacy of the neurostimulation for each of the stimulation sites; moving one or more of the stimulation sites to a new site within the search area; wherein a stimulation site with lower efficacy is moved further than a stimulation site with higher efficacy is moved; and ending the moving of the stimulation sites when a predetermined efficacy goal for the neurostimulation is found or a predetermined number of change iterations is performed.

In Example 4, the subject matter of Example 3 optionally includes moving a stimulation site with lower efficacy closer to a stimulation site with higher efficacy.

In Example 5, the subject matter of Example 3 optionally includes moving a stimulation site with lower efficacy to a stimulation site selected randomly by the neurostimulation device.

In Example 6, the subject matter of one or any combination of Examples 2-5 optionally includes recurrently changing the stimulation direction of the neurostimulation by changing electrodes of one or more multi-segmented leads used to deliver the neurostimulation; determining efficacy of the neurostimulation for each of the stimulation directions; and ending the moving of the stimulation direction when a predetermined efficacy goal for the neurostimulation is found or a predetermined number of change iterations is performed.

In Example 7, the subject matter of one or any combination of Examples 1-6 optionally includes recurrently changing a spacing between a stimulation anode and a stimulation electrode at each of the determined optimum stimulation sites within the search area when the spacing is the highest priority remaining parameter to be varied; and ending the changing of the spacing when a predetermined efficacy goal for the neurostimulation is found or a predetermined number of change iterations is performed.

In Example 8, the subject matter of one or any combination of Examples 1-7 optionally includes recurrently changing one or more of amplitude and pulse width of the neurostimulation energy when the one or more of amplitude and pulse width are the highest priority remaining parameters to be varied; and ending the changing of the amplitude and the pulse width when a predetermined efficacy goal for the neurostimulation is found or a predetermined number of change iterations is performed.

In Example 9, the subject matter of one or any combination of Examples 1-8 optionally includes recurrently changing, according to the parameter priority, one or more of time between neurostimulation pulses, number of pulses in a burst of neurostimulation pulses, and time between bursts of neurostimulation pulses.

In Example 10, the subject matter of one or any combination of Examples 1-9 optionally includes recurrently changing, according to the parameter priority, one or more of rate modulation, amplitude modulation, pulse width modulation at one or more of the stimulation sites.

In Example 11, the subject matter of one or any combination of Examples 1-10 optionally includes recurrently randomly changing one or more of time between neurostimulation pulses, number of pulses in bursts of neurostimulation pulses, time between bursts of neurostimulation pulses, rate modulation, amplitude modulation, and pulse width modulation at one or more of the stimulation sites.

In Example 12, the subject matter of one or any combination of Examples 1-11 optionally includes including receiving, by the neurostimulation device, the prioritized parameter search list via a user interface of the neurostimulation device.

In Example 13, the subject matter of one or any combination of Examples 1-12 optionally includes determining highest priority and lower priority neurostimulation parameters that provide sub-perception neurostimulation not perceived by the subject.

Example 14 includes subject matter (such as a neurostimulation device for electrical connection to a plurality of implantable electrodes) or can optionally be combined with one or any combination of Examples 1-13 to include such subject matter, comprising a therapy circuit configured to deliver electrical neurostimulation energy to the plurality of implantable electrodes; a port; and a control circuit operatively coupled to the therapy circuit and the port. The control circuit is configured to receive, via the port, a selection of a physiological search area of a subject for delivering the neurostimulation energy; initiate delivery of the neurostimulation in turn to multiple stimulation sites within the search area; change the multiple stimulation sites while holding other neurostimulation parameters constant; determine optimum stimulation sites within the search area; initiate delivery of the neurostimulation to the determined optimum stimulation sites while varying the other parameters of the neurostimulation energy according to a predetermined parameter priority; and determine optimum parameter values of the other parameters of the neurostimulation energy.

In Example 13, the subject matter of Example 14 optionally includes a control circuit configured to recurrently initiate the delivery of the neurostimulation to multiple selected stimulation sites within the search area while the other neurostimulation parameters are unchanged; determine efficacy of the neurostimulation for each of the multiple selected stimulation sites; change the selected multiple stimulation sites by moving one or more of the selected stimulation sites within the search area, wherein a stimulation site with lower efficacy is moved further than a stimulation site with higher efficacy is moved; and end the changing of the selected multiple stimulation sites when a predetermined efficacy goal for the neurostimulation is found or a predetermined number of changes iterations is performed.

In Example 16, the subject matter of one or both of Examples 14 and 15 optionally includes a control circuit configured to vary a spacing between stimulation electrodes according to the predetermined parameter priority, including: recurrently change a spacing between a stimulation anode and a stimulation electrode at each of the determined optimum stimulation sites within the search area; and end the changing of the spacing when a predetermined efficacy goal for the neurostimulation is found or a predetermined number of change iterations is performed.

In Example 17, the subject matter of one or any combination of Examples 14-16 optionally includes a user interface operatively coupled to the port; and a control circuit configured to receive, via the user interface, the predetermined parameter priority, and the predetermined number of change iterations.

Example 18 includes subject matter (or can optionally be combined with one or any combination of Example 1-17 to include such subject matter) such as a computer readable storage medium including instructions that when performed by a controller circuit of a neurostimulation device, cause the neurostimulation device to perform actions including receiving an indication of a physiological search area of a subject for delivering electrical neurostimulation; varying parameters of neurostimulation delivered to the search area according to parameter priority, wherein stimulation site has a highest parameter priority and is varied first while lower priority parameters are held constant; and initiating delivery of the neurostimulation within the search area. The delivery of the neurostimulation within the search area includes applying the neurostimulation in turn to multiple stimulation sites within the search area while holding lower priority parameters constant; determining optimum stimulation sites within the search area; initiating delivery of neurostimulation to the determined optimum stimulation sites that varies one or more lower priority parameters according to the parameter priority; and determining optimum lower priority parameters for the neurostimulation.

In Example 19, the subject matter of Example 18 optionally includes a computer readable storage medium including instructions that cause the cause the neurostimulation device to recurrently apply the neurostimulation in turn to the multiple stimulation sites within the search area, which includes determining efficacy of the neurostimulation for each of the stimulation sites; moving one or more of the stimulation sites to a new site within the search area, wherein a stimulation site with lower efficacy is moved further than a stimulation site with higher efficacy is moved; and ending the moving of the stimulation sites when a predetermined efficacy goal for the neurostimulation is found or a predetermined number of changes iterations is performed.

In Example 20, the subject matter of one or both of Examples 18 and 19 optionally includes a computer readable storage medium including instructions that cause the cause the neurostimulation device to move a stimulation site with lower determined efficacy closer to a stimulation site with higher determined efficacy.

These non-limiting examples can be combined in any permutation or combination.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 7A-7B illustrate an example of an automated technique for searching and evaluating neurostimulation parameters.

FIGS. 8A-8B, 9A-9B illustrate an example of a search technique to find an optimum stimulation site for the neurostimulation.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. References to "an", "one", or "various" embodiments in this disclosure are not necessarily to the same embodiment, and such references contemplate more than one embodiment. The following detailed description provides examples, and the scope of the present invention is defined by the appended claims and their legal equivalents.

This document discusses devices, systems and methods for programming and delivering electrical neurostimulation to a patient or subject. Advancements in neuroscience and neurostimulation research have led to a demand for delivering complex patterns of neurostimulation energy for various types of therapies. The present system may be implemented using a combination of hardware and software designed to apply any neurostimulation (neuromodulation) therapy, including but not being limited to SCS, DBS, PNS, FES, and Vagus Nerve Stimulation (VNS) therapies.

Figure 1:
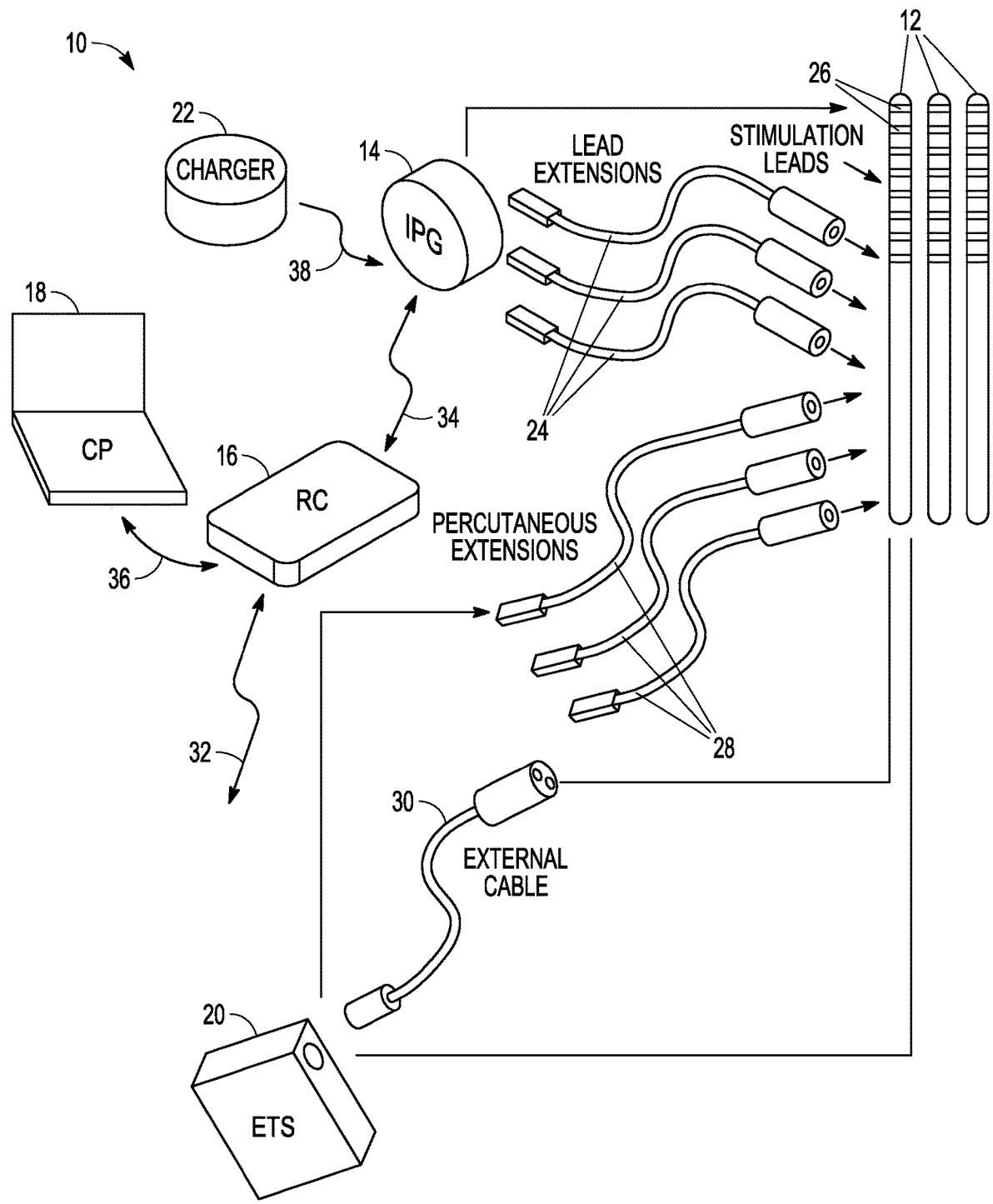
FIG. 1 is an illustration of portions of an example of an electrical neurostimulation system.

FIG. 1 is an illustration of portions of an embodiment of an electrical stimulation system 10 that includes one or more stimulation leads 12 and an implantable pulse generator (IPG) 14. The system 10 can also include one or more of an external remote control (RC) 16, a clinician's programmer (CP) 18, an external trial stimulator (ETS) 20, or an external charger 22. The IPG 14 can optionally be physically connected via one or more lead extensions 24, to the stimulation lead(s) 12. Each lead carries multiple electrodes 26 arranged in an array. The IPG 14 includes pulse generation circuitry that delivers electrical stimulation energy in the form of, for example, a pulsed electrical waveform (i.e., a temporal series of electrical pulses) to the electrode array 26 in accordance with a set of stimulation parameters. The IPG 14 can be implanted into a patient's body, for example, below the patient's clavicle area or within the patient's buttocks or abdominal cavity. The implantable pulse generator can have multiple stimulation channels (e.g., 8 or 16) which may be independently programmable to control the magnitude of the current stimulus from each channel. The IPG 14 can have one, two, three, four, or more connector ports, for receiving the terminals of the leads 12.

The ETS 20 may also be physically connected, optionally via the percutaneous lead extensions 28 and external cable 30, to the stimulation leads 12. The ETS 20, which may have similar pulse generation circuitry as the IPG 14, can also deliver electrical stimulation energy in the form of, for example, a pulsed electrical waveform to the electrode array 26 in accordance with a set of stimulation parameters. One difference between the ETS 20 and the IPG 14 is that the ETS 20 is often a non-implantable device that is used on a trial basis after the neurostimulation leads 12 have been implanted and prior to implantation of the IPG 14, to test the responsiveness of the stimulation that is to be provided. Any functions described herein with respect to the IPG 14 can likewise be performed with respect to the ETS 20.

The RC 16 may be used to telemetrically communicate with or control the IPG 14 or ETS 20 via a wireless communications link 32. Once the IPG 14 and neurostimulation leads 12 are implanted, the RC 16 may be used to telemetrically communicate with or control the IPG 14 via communications link 34. The communication or control allows the IPG 14 to be turned on or off and to be programmed with different stimulation parameter sets. The IPG 14 may also be operated to modify the programmed stimulation parameters to actively control the characteristics of the electrical stimulation energy output by the IPG 14. The CP 18 allows a user, such as a clinician, the ability to program stimulation parameters for the IPG 14 and ETS 20 in the operating room and in follow-up sessions. The CP 18 may perform this function by indirectly communicating with the IPG 14 or ETS 20, through the RC 16, via a wireless communications link 36. Alternatively, the CP 18 may directly communicate with the IPG 14 or ETS 20 via a wireless communications link (not shown). The stimulation parameters provided by the CP 18 are also used to program the RC 16, so that the stimulation parameters can be subsequently modified by operation of the RC 16 in a stand-alone mode (i.e., without the assistance of the CP 18).

For purposes of brevity, the details of the RC 16, CP 18, ETS 20, and external charger 22 will not be further described herein. Details of exemplary embodiments of these devices are disclosed in U.S. Pat. No. 6,895,280, which is incorporated herein by reference. Other embodiments of electrical stimulation systems can be found at U.S. Pat. Nos. 6,181,969; 6,516,227; 6,609,029; 6,609,032; 6,741,892; 7,949,395; 7,244,150; 7,672,734; 7,761,165; 7,974,706; 8,175,710; 8,224,450; 8,364,278; and 8,700,178, all of which are incorporated herein by reference.

Figure 2:
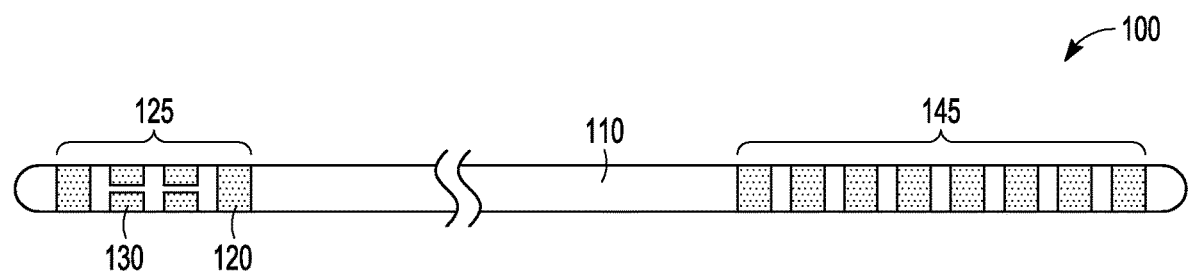
FIG. 2 is a schematic side view of an example of an electrical neurostimulation lead.

FIG. 2 is a schematic side view of an embodiment of an electrical stimulation lead. FIG. 2 illustrates a lead 110 with electrodes 125 disposed at least partially about a circumference of the lead 110 along a distal end portion of the lead and terminals 145 disposed along a proximal end portion of the lead. The lead 110 can be implanted near or within the desired portion of the body to be stimulated (e.g., the brain, spinal cord, or other body organs or tissues). In one example of operation for deep brain stimulation, access to the desired position in the brain can be accomplished by drilling a hole in the patient's skull or cranium with a cranial drill (commonly referred to as a burr), and coagulating and incising the dura mater, or brain covering. The lead 110 can be inserted into the cranium and brain tissue with the assistance of a stylet (not shown). The lead 110 can be guided to the target location within the brain using, for example, a stereotactic frame and a microdrive motor system. In some embodiments, the microdrive motor system can be fully or partially automatic. The microdrive motor system may be configured to perform one or more the following actions (alone or in combination): insert the lead 110, advance the lead 110, retract the lead 110, or rotate the lead 110.

In some embodiments, measurement devices coupled to the muscles or other tissues stimulated by the target neurons, or a unit responsive to the patient or clinician, can be coupled to the implantable pulse generator or microdrive motor system. The measurement device, user, or clinician can indicate a response by the target muscles or other tissues to the stimulation or recording electrode(s) to further identify the target neurons and facilitate positioning of the stimulation electrode(s). For example, if the target neurons are directed to a muscle experiencing tremors, a measurement device can be used to observe the muscle and indicate changes in, for example, tremor frequency or amplitude in response to stimulation of neurons. Alternatively, the patient or clinician can observe the muscle and provide feedback.

Figure 3:
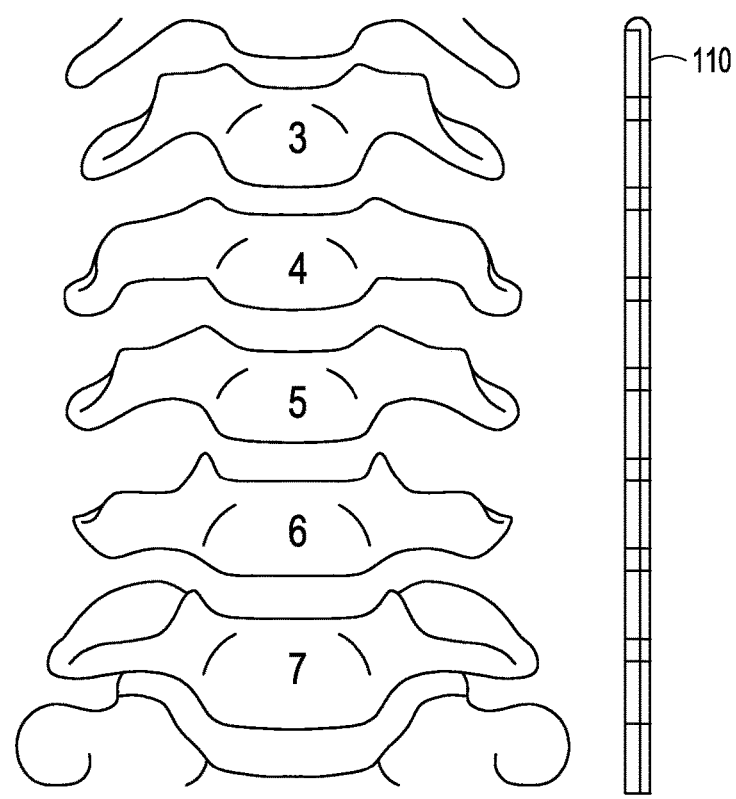
FIG. 3 shows an illustration of a multi-electrode lead for stimulating nerves of the spinal cord.

FIG. 3 shows an illustration of an example of a multi-electrode lead 110 for stimulating nerves of the spinal cord. In the example, the lead and electrodes are shown next to thoracic spine vertebrate 3-7, but the lead and electrodes are not drawn to the same scale as the thoracic spine. The lead 110 for neurostimulation can include stimulation electrodes, recording electrodes, or both. In at least some embodiments, the lead 110 is rotatable so that the stimulation electrodes can be aligned with the target neurons after the neurons have been located using the recording electrodes. Stimulation electrodes may be disposed on the circumference of the lead 110 to stimulate the target neurons. The target neurons may be in any region of the spinal cord within the region of thoracic spine vertebrate 3-7 or other region of spine vertebrate, and the target region may be reached by selecting the electrodes for stimulation by programming the IPG 14 or ETS 20. Stimulation electrodes may be ring-shaped so that current projects from each electrode equally in every direction from the position of the electrode along a length of the lead 110.

Returning to the example of FIG. 2, two of the electrodes 120 are ring electrodes 120. Ring electrodes typically do not enable stimulus current to be directed from only a limited angular range around of the lead. Segmented electrodes 130, however, can be used to direct stimulus current to a selected angular range around the lead. When segmented electrodes are used in conjunction with an IPG 14 that delivers constant current stimulus, current steering can be achieved to more precisely deliver the stimulus to a position around an axis of the lead (e.g., radial positioning around the axis of the lead). To achieve current steering, segmented electrodes can be utilized in addition to, or as an alternative to, ring electrodes.

The lead 100 includes a lead body 110, terminals 145, and one or more ring electrodes 120 and one or more sets of segmented electrodes 130 (or any other combination of electrodes). The lead body 110 can be formed of a biocompatible, non-conducting material such as, for example, a polymeric material. Suitable polymeric materials include, but are not limited to, silicone, polyurethane, polyurea, polyurethaneurea, polyethylene, or the like. Once implanted in the body, the lead 100 may be in contact with body tissue for extended periods of time. In at least some embodiments, the lead 100 has a cross-sectional diameter of no more than 1.5 millimeters (1.5 mm) and may be in the range of 0.5 to 1.5 mm. In at least some embodiments, the lead 100 has a length of at least 10 centimeters (10 cm) and the length of the lead 100 may be in the range of 10 to 70 cm.

The electrodes 125 can be made using a metal, alloy, conductive oxide, or any other suitable conductive biocompatible material. Examples of suitable materials include, but are not limited to, platinum, platinum iridium alloy, iridium, titanium, tungsten, palladium, palladium rhodium, or the like. Preferably, the electrodes are made of a material that is biocompatible and does not substantially corrode under expected operating conditions in the operating environment for the expected duration of use. Each of the electrodes can either be used or unused (OFF). When the electrode is used, the electrode can be used as an anode or cathode and carry anodic or cathodic current. In some instances, an electrode might be an anode for a period of time and a cathode for a period of time.

Spinal cord stimulation leads, deep brain stimulation leads, and other leads may include one or more sets of segmented electrodes. Segmented electrodes may provide for superior current steering than ring electrodes because target structures in deep brain stimulation or other stimulation are not typically symmetric about the axis of the distal electrode array. Instead, a target may be located on one side of a plane running through the axis of the lead. Through the use of a radially segmented electrode array ("RSEA"), current steering can be performed not only along a length of the lead but also around a circumference of the lead. This provides precise three-dimensional targeting and delivery of the current stimulus to neural target tissue, while potentially avoiding stimulation of other tissue.

Any number of segmented electrodes 130 may be disposed on the lead body 110 including, for example, anywhere from one to sixteen or more segmented electrodes 130. It will be understood that any number of segmented electrodes 130 may be disposed along the length of the lead body 110. A segmented electrode 130 typically extends only 75%, 67%, 60%, 50%, 40%, 33%, 25%, 20%, 17%, 15%, or less around the circumference of the lead.

The segmented electrodes 130 may be grouped into sets of segmented electrodes, where each set is disposed around a circumference of the lead 100 at a particular longitudinal portion of the lead 100. The lead 100 may have any number segmented electrodes 130 in a given set of segmented electrodes. The lead 100 may have one, two, three, four, five, six, seven, eight, or more segmented electrodes 130 in a given set. In at least some embodiments, each set of segmented electrodes 130 of the lead 100 contains the same number of segmented electrodes 130. The segmented electrodes 130 disposed on the lead 100 may include a different number of electrodes than at least one other set of segmented electrodes 130 disposed on the lead 100. The segmented electrodes 130 may vary in size and shape. In some embodiments, the segmented electrodes 130 are all the same size, shape, diameter, width or area or any combination thereof. In some embodiments, the segmented electrodes 130 of each circumferential set (or even all segmented electrodes disposed on the lead 100) may be identical in size and shape.

Each set of segmented electrodes 130 may be disposed around the circumference of the lead body 110 to form a substantially cylindrical shape around the lead body 110. The spacing between individual electrodes of a given set of the segmented electrodes may be the same, or different from, the spacing between individual electrodes of another set of segmented electrodes on the lead 100. In at least some embodiments, equal spaces, gaps, or cutouts are disposed between each segmented electrode 130 around the circumference of the lead body 110. In other embodiments, the spaces, gaps or cutouts between the segmented electrodes 130 may differ in size, or cutouts between segmented electrodes 130 may be uniform for a particular set of the segmented electrodes 130 or for all sets of the segmented electrodes 130. The sets of segmented electrodes 130 may be positioned in irregular or regular intervals along a length the lead body 110.

Conductor wires (not shown) that attach to the ring electrodes 120 or segmented electrodes 130 extend along the lead body 110. These conductor wires may extend through the material of the lead 100 or along one or more lumens defined by the lead 100, or both. The conductor wires couple the electrodes 120, 130 to the terminals 145.

Figure 4A:
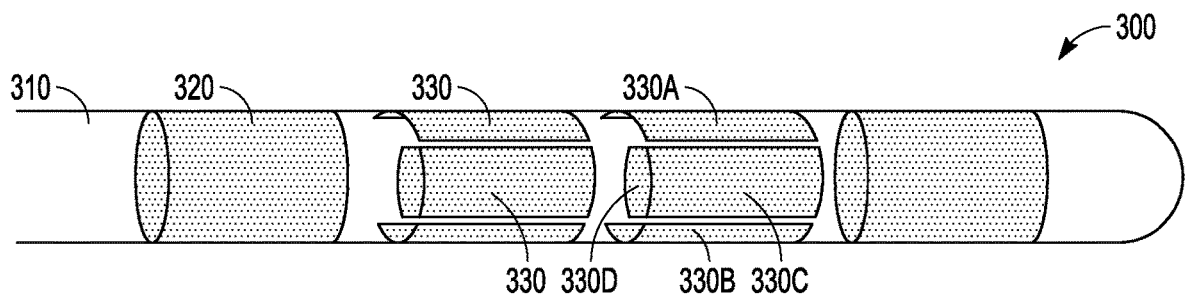
FIGS. 4A-4H are illustrations of different embodiments of leads with segmented electrodes.
Figure 4B:
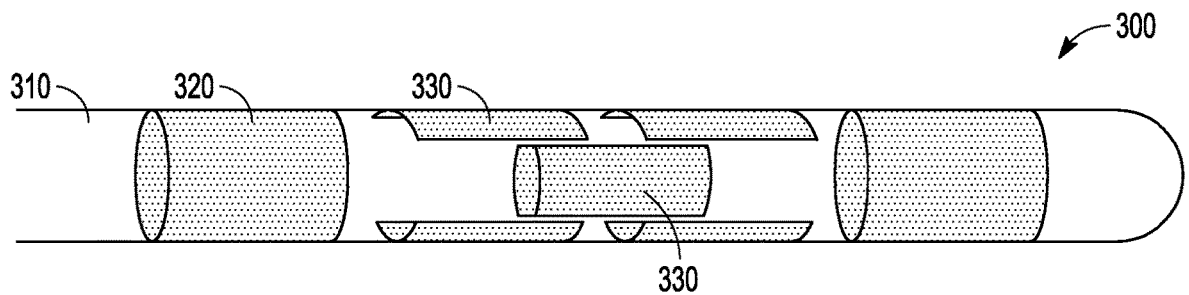
Figure 4C:
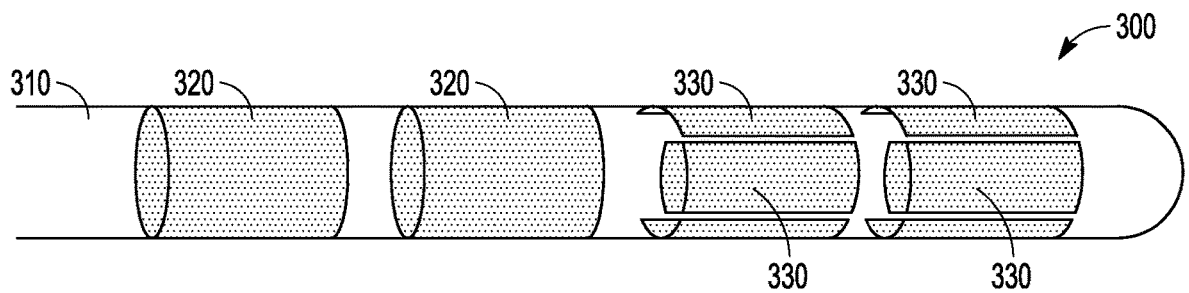
Figure 4D:
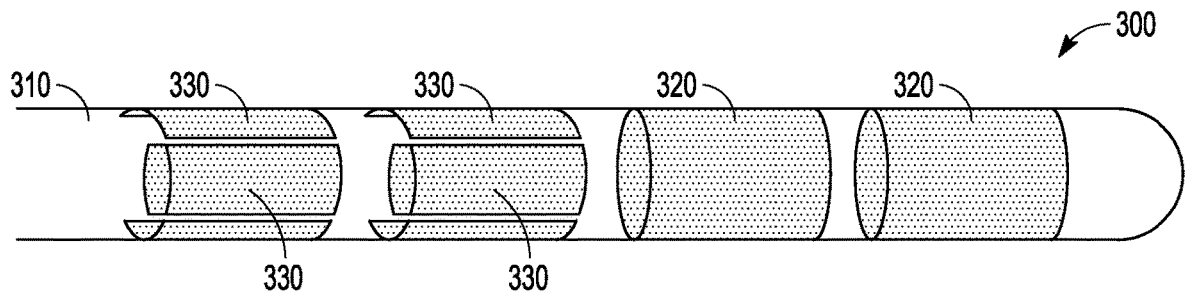
Figure 4E:
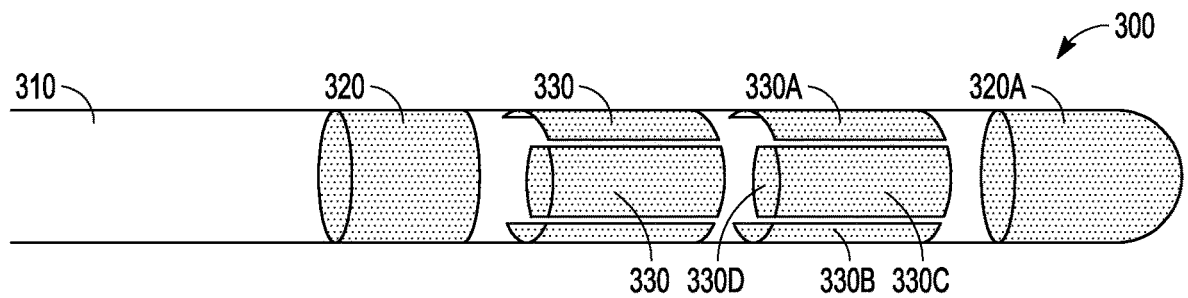
Figure 4F:
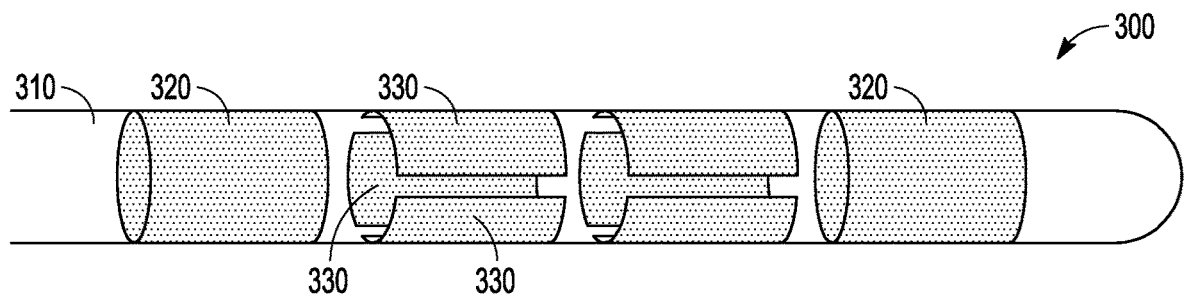
Figure 4G:
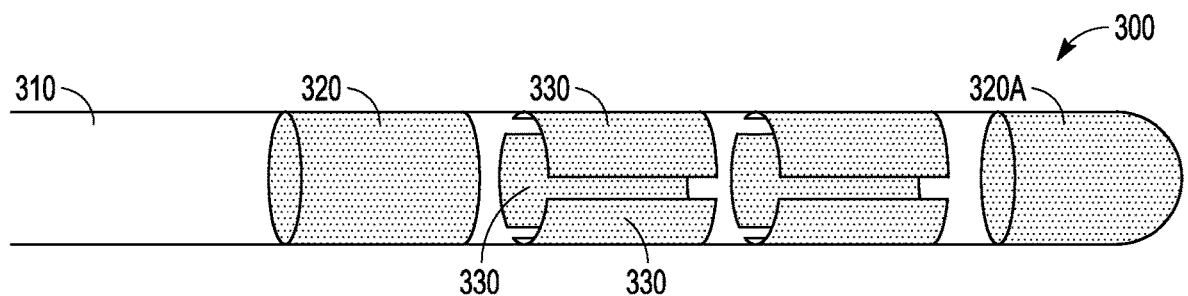
Figure 4H:
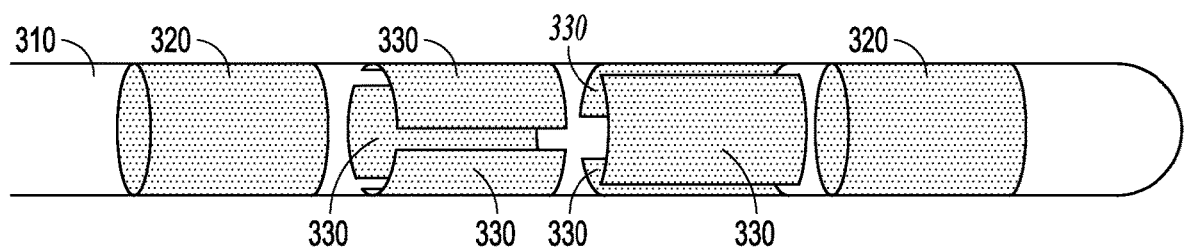

FIGS. 4A-4H are illustrations of different embodiments of leads 300 with segmented electrodes 330, optional ring electrodes 320 or tip electrodes 320a, and a lead body 310. The sets of segmented electrodes 330 each include either two (FIG. 4B), three (FIGS. 4E-4H), or four (FIGS. 4A, 4C, and 4D) or any other number of segmented electrodes including, for example, three, five, six, or more. The sets of segmented electrodes 330 can be aligned with each other (FIGS. 4A-4G) or staggered (FIG. 4H).

When the lead 100 includes both ring electrodes 120 and segmented electrodes 130, the ring electrodes 120 and the segmented electrodes 130 may be arranged in any suitable configuration. For example, when the lead 100 includes two ring electrodes 120 and two sets of segmented electrodes 130, the ring electrodes 120 can flank the two sets of segmented electrodes 130 (see e.g., FIGS. 2, 4A, and 4E-4H, ring electrodes 320 and segmented electrode 330). Alternately, the two sets of ring electrodes 120 can be disposed proximal to the two sets of segmented electrodes 130 (see e.g., FIG. 4C, ring electrodes 320 and segmented electrode 330), or the two sets of ring electrodes 120 can be disposed distal to the two sets of segmented electrodes 130 (see e.g., FIG. 4D, ring electrodes 320 and segmented electrode 330). One of the ring electrodes can be a tip electrode (see e.g., tip electrode 320a of FIGS. 4E and 4G). It will be understood that other configurations are possible as well (e.g., alternating ring and segmented electrodes, or the like).

By varying the location of the segmented electrodes 130, different coverage of the target neurons may be selected. For example, the electrode arrangement of FIG. 4C may be useful if the physician anticipates that the neural target will be closer to a distal tip of the lead body 110, while the electrode arrangement of FIG. 4D may be useful if the physician anticipates that the neural target will be closer to a proximal end of the lead body 110.

Any combination of ring electrodes 120 and segmented electrodes 130 may be disposed on the lead 100. For example, the lead may include a first ring electrode 120, two sets of segmented electrodes; each set formed of four segmented electrodes 130, and a final ring electrode 120 at the end of the lead. This configuration may simply be referred to as a 1-4-4-1 configuration (FIGS. 4A and 4E, ring electrodes 320 and segmented electrode 330). It may be useful to refer to the electrodes with this shorthand notation. Thus, the embodiment of FIG. 4C may be referred to as a 1-1-4-4 configuration, while the embodiment of FIG. 4D may be referred to as a 4-4-1-1 configuration. The embodiments of FIGS. 4F, 4G, and 4H can be referred to as a 1-3-3-1 configuration. Other electrode configurations include, for example, a 2-2-2-2 configuration, where four sets of segmented electrodes are disposed on the lead, and a 4-4 configuration, where two sets of segmented electrodes, each having four segmented electrodes 130 are disposed on the lead. The 1-3-3-1 electrode configuration of FIGS. 4F, 4G, and 4H has two sets of segmented electrodes, each set containing three electrodes disposed around the circumference of the lead, flanked by two ring electrodes (FIGS. 4F and 4H) or a ring electrode and a tip electrode (FIG. 4G). In some embodiments, the lead includes 16 electrodes. Possible configurations for a 16-electrode lead include, but are not limited to 4-4-4-4; 8-8; 3-3-3-3-3-1 (and all rearrangements of this configuration); and 2-2-2-2-2-2-2-2.

Any other suitable arrangements of segmented and/or ring electrodes can be used including, but not limited to, those disclosed in U.S. Patent Applications Publication Nos. 2012/0197375 and 2015/0045864, which are incorporated herein by reference. As an example, arrangements in which segmented electrodes are arranged helically with respect to each other. One embodiment includes a double helix.

One or more electrical stimulation leads can be implanted in the body of a patient (for example, in the brain or by the spinal cord of the patient) and used to stimulate surrounding tissue. The electrical stimulation leads can provide electrical neurostimulation to multiple stimulation sites after implantation and to provide different stimulation geometries to the patient.

Figure 5:
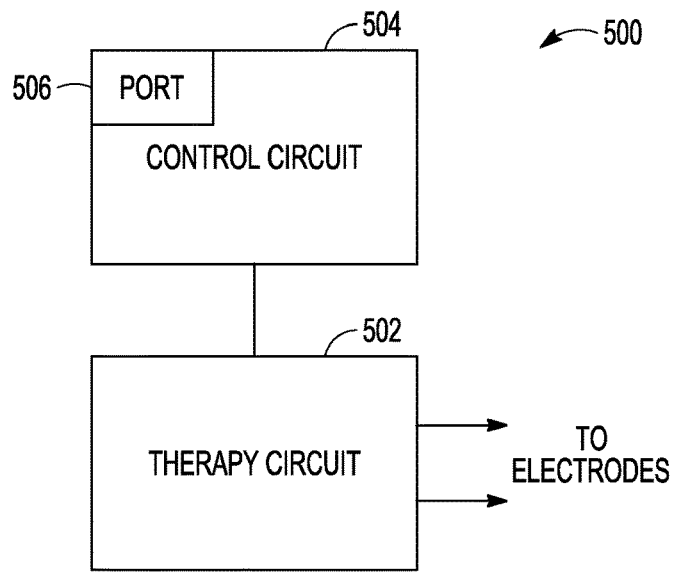
FIG. 5 is a block diagram of portions of an embodiment of a neurostimulation device.

FIG. 5 is a block diagram of portions of an embodiment of a medical device 500 for providing neurostimulation. The portions of the medical device shown may be included in an IPG or an ETS. The medical device 500 includes a therapy circuit 502 and a control circuit 504. The therapy circuit 502 can be operatively coupled to stimulation electrodes such as any of the electrodes described herein and provides or delivers electrical neurostimulation energy to the electrodes.

The control circuit 504 can include a processor such as a microprocessor, a digital signal processor, application specific integrated circuit (ASIC), or other type of processor, interpreting or executing instructions in software modules or firmware modules. In some embodiments, the control circuit 504 includes a logic sequencer circuit. A logic sequencer refers to a state machine or other circuit that sequentially steps through a fixed series of steps to perform one or more functions. The steps are typically implemented in hardware or firmware. The control circuit 504 can include other circuits or sub-circuits to perform the functions described. These circuits may include software, hardware, firmware or any combination thereof. Multiple functions can be performed in one or more of the circuits or sub-circuits as desired. For example, the control circuit 504 initiates delivery of bursts of pulses of the electrical neurostimulation energy to the electrodes and can change the electrodes used to provide the neurostimulation energy. The control circuit 504 can include one or more timer sub-circuits to time the activation and deactivation of the therapy circuit 502 to implement the burst timing.

The control circuit 504 is connected to a port 506. If the medical device 500 is an ETS, the port 506 can be a communication port (COMM port) that receives information form another device, or the port 506 can receive information from a user interface of the ETS. If the medical device 500 is an IPG, the port 506 may be connected to a wireless telemetry circuit (not shown) that receives information wirelessly from a CP.

If the medical device 500 is an ETS, the clinician may enter stimulation parameters directly. If the medical device 500 is an IPG, the clinician may program the IPG using the clinician programmer, remote control, or other programming device. According to at least some programming techniques, the clinician enters stimulator parameters for a stimulation program and the stimulation program is used to stimulate the patient. The clinician observes the patient response. In at least some instances, the clinician asks the patient to describe, rate, or otherwise provide information about the effects of the stimulation (e.g., what portion of the body is affected, how strong is the stimulation effect, whether there are side effects or negative effects, etc.).

As explained previously herein, some modes of neurostimulation (such as SCS) may depend on an intricate balance of stimulation location with the correct stimulation waveform. Neurostimulation systems can be programmable in stimulation sites, stimulation pulse amplitude, pulse width, pulse rate, and pulse pattern to provide many different neurostimulation waveforms. A manual search for the best combination of stimulation parameters can become tedious very quickly.

An automated programming approach would free up the clinician from a tedious search of programming options and allow the clinician more time for human-centric tasks related to patient care. However, an unfocused point-by-point search can take a lot of time, even when automated. An improved approach would automatically search through spatiotemporal settings for neurostimulation using a distributed and tiered approach to streamline the searching.

Figure 6:
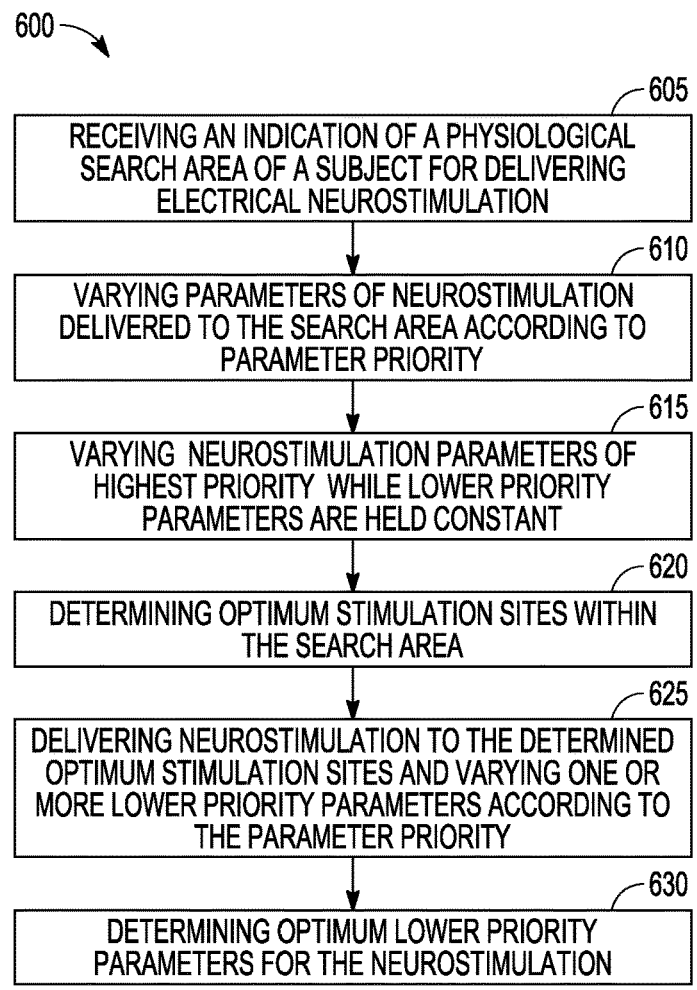
FIG. 6 is a flow diagram of an example of a method of controlling operation of a neurostimulation device.

FIG. 6 is a flow diagram of an example of a method 600 of controlling operation of a neurostimulation device. The method 600 may be performed by an ETS, or by a CP or RC communicating commands to an IPG. In certain examples, the method 600 is performed by a patient health application (or app) on the patient's phone communicating commands to an IPG. In certain examples, the method 600 is performed using a cloud-based server communicating commands to an ETS, CP or IPG.

The method 600 provides a streamlined approach to programming through prioritized parameter searching. The parameter searching is tiered according to priority assigned to parameters. Stimulation parameters with the highest priority (such as stimulation location) are searched and tested first with the lower priority parameters held constant. When the higher priority parameters are set after testing, the next lower priority parameters are searched and tested. The process continues through the tiers until the neurostimulation parameters are set.

At block 605, the neurostimulation device receives an indication of a physiological search area of a subject. For example, the subject may be a patient who is to receive SCS to relieve pain. Implantable leads may have been implanted in the patient and the clinician wants the search algorithm to find the best set of stimulation parameters that provide sub-perception neurostimulation pain relief for the patient. Sub-perception neurostimulation pain relief refers to neurostimulation that provides a benefit to the patient without the patient perceiving the neurostimulation, such as by paresthesia due to the stimulation. The ETS or CP can include a user interface and a clinician uses the interface to enter a spinal range to which neurostimulation will be applied. In variations, the neurostimulation is DBS, and the clinician specifies a region of the brain to which neurostimulation will be applied (e.g., to treat Parkinson's Disease).

At block 610, the neurostimulation device varies the parameters of neurostimulation delivered to the search area according to parameter priority. The parameter priority may be a default order of priority, or a priority entered by the user. At block 615, one or more parameters of the highest tier are varied for neurostimulation provided to the subject within the search area while lower priority parameters are held constant. The value of the lower priority parameters during the higher tier testing may be default parameter values or values entered by the user. At block 620, optimum stimulation sites within the search area are determined.

FIGS. 7A-7B illustrate an example of the parameter search scheme in which the neurostimulation is SCS. The FIGS. 7A-7B are examples of information that may be presented on a display of a user interface of the neurostimulation device during testing. FIG. 7A shows a contour of the spine 702 and indications of thoracic spinal vertebrate T8-T12 and lumbar spinal vertebrate L1. FIG. 7A also shows a representation of implanted leads 110. The selected search area is a region covered by the implanted leads (e.g., a region from T8-T11).

FIG. 7A also shows six stimulation sites 704A-704F. The number of stimulation sites evaluated during testing may be set by the user or capped by the neurostimulation device programming. The stimulation sites selected at the start of the testing may be pre-defined recommendations from the device, user-selected, randomly seeded by the device, or any combination of pre-defined sites, user-selected sites, and randomly selected sites. In the example of FIG. 7A, stimulation site 704A is pre-defined, stimulation sites 704B and 704D are user selected, and stimulation sites 704C, 704E, 704F are randomly seeded. Stimulation site 704A is the starting point for the testing. The starting point may be selectable by the user.

FIG. 7B shows the settings for lower priority parameters that are held constant during the stimulation site testing. The lower priority parameters shown in the example of FIG. 7B are amplitude and focus distance for each of the stimulation sites. On the Y-axis of the graph, the values of amplitude are given as a fraction of the paresthesia threshold (PT), and on the x-axis of the graph the values of focus distance are given in millimeters (mm). For a bipolar stimulation geometry, focus distance is the distance between the anode and cathode of the stimulation electrodes of the lead or leads. Other stimulation geometries can be implemented using the leads and lead electrodes described herein, such as tripolar stimulation, multi-electrode contour stimulation, stimulation fields derived from dorsal horn stimulation (DHS). Stimulation geometry may be a parameter prioritized for testing and evaluation.

If the neurostimulation is DBS, changing the stimulation geometry may include changing the "directionality" or "angle" of stimulation on a multisegmented "directional" lead in addition to or alternatively to a change in focus or a change in rostrocaudal position of the neuro stimulation. Directionality of stimulation may be a parameter prioritized for testing and evaluation. The directionality parameter may include the electrodes used in the stimulation. In some examples, the directionality of stimulation parameter can be specified by a vector, arrow, and the like, and the coordinates defining that vector.

Each point in FIGS. 7A and 7B represents a neurostimulation program that is to be evaluated. The efficacy of a neurostimulation program can be evaluated using outcome metrics such as a pain score, amount of overlap between paresthesia and pain, side effects, patient preference, etc. The efficacy of the neurostimulation can also be evaluated using more holistic patient measures such as device-determined activity level of the patient or sleep quality of the patient. Other holistic patient measures can include survey responses of the patient beyond simply the pain of the patient. To evaluate the neurostimulation programs, the programs are run for a predetermined period of time that can be set by the user. The evaluation may be done in a clinical setting or in a setting remote from a clinic if the testing is run using a CP and IPG, RC and IPG, or cloud-based testing.

FIGS. 8A-8B illustrate an example of the search scheme cycling only through the stimulation site parameter while the lower priority parameters amplitude and focus distance are held constant. The neurostimulation system cycles through the neurostimulation program for each of the stimulation sites. In FIG. 8A the single criterion of Placement is shown as "Cycling" while the Amplitude and Focus Distance Parameters are shown as "Fixed" in FIG. 8B. The testing of each of the neurostimulation programs may be run for a specified time period (e.g., 10 seconds with a pause in between tests) or a specified number of cycles (e.g., 5 cycles). Each of the neurostimulation programs are evaluated against the outcome metrics. A rating for each of the neurostimulation program outcomes are presented to the user. The ratings may be based on a cost function based on the outcome metrics.

In the Example of FIG. 8A, the ratings presented are "Good," "OK," or "Bad." Stimulation sites 704A, 704D are rated "OK," stimulation sites 704B, 704C are rated "Good," and stimulation cites 704E, 704F are rated "Bad." Other types of ratings can include a numeric score, a colored indicator, etc.

Figures 9A, 9B:
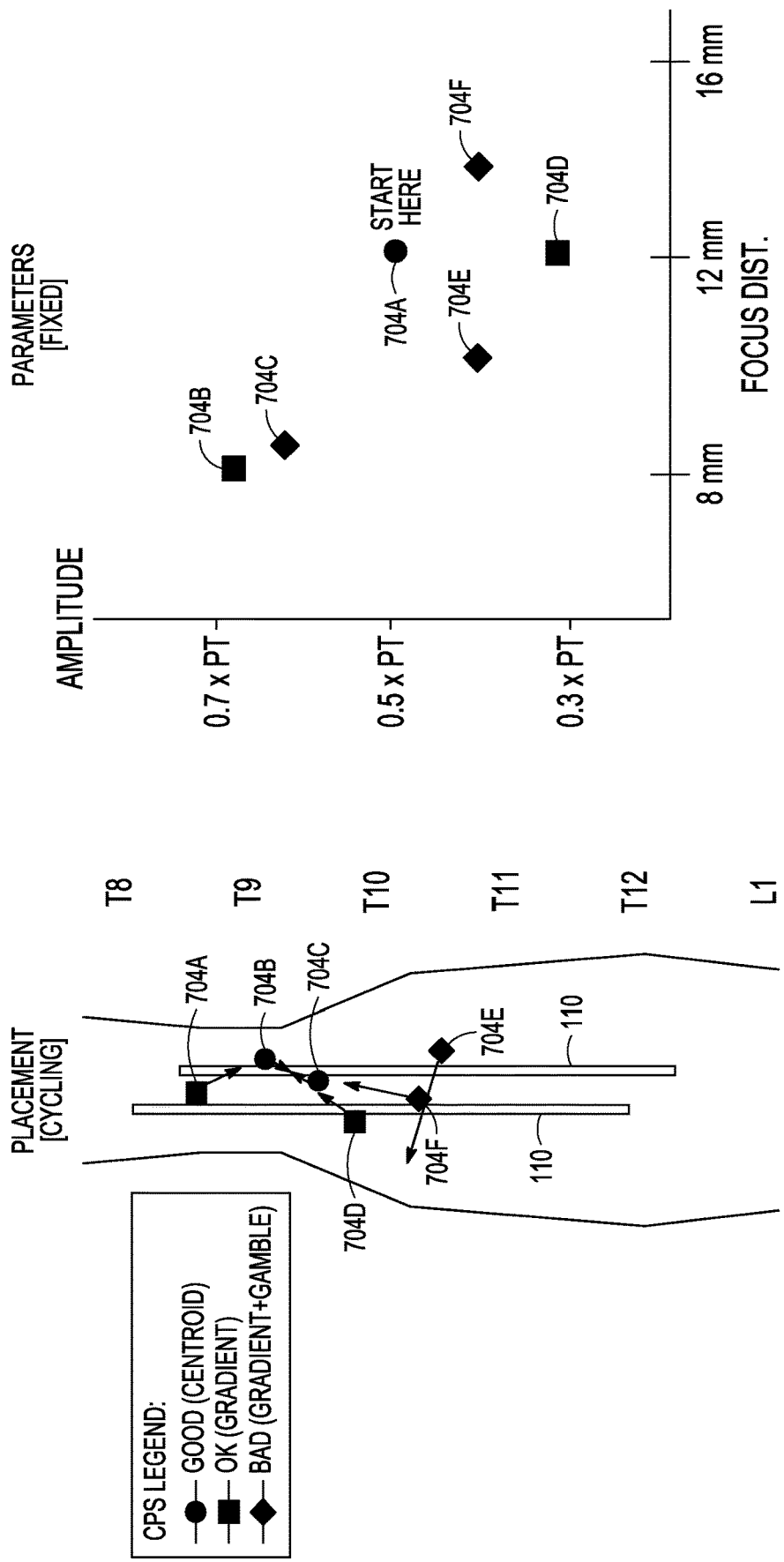

FIGS. 9A and 9B further illustrate the example of the search scheme cycling through the stimulation site parameter while the lower priority parameters are held constant. When the first cycles of testing and evaluation are completed, one or more of the stimulation sites are moved to a new site within the search area for the next iteration of cycling. How far the stimulation sites are moved for the next iteration depends on the rating of efficacy of the neurostimulation. Stimulation sites with lower efficacy are moved further than a stimulation site with higher efficacy.

In the example of FIG. 9A, stimulation sites 704B, 704C had the best rating ("Good") after the first iteration and are moved the least for the next iteration. Stimulation sites 704E, 704F had the worst rating ("Bad") and are moved the farthest for the next iteration. In some examples, the stimulation sites with lower ratings are moved closer to the stimulation sites with higher ratings, or according to some other policy based on ratings. In some examples, the stimulation sites are moved towards a common centroid, or via gradient descent. In some examples, the stimulation sites with the worst rating are moved to a new random stimulation site.

The process continues with iterations of moving the stimulation sites and testing the neurostimulation programs at the selected stimulation sites until one or more criteria for the stimulation sites is met. For example, the search technique may end the moving of the stimulation sites when a predetermined efficacy goal for the neurostimulation is found or a predetermined number (e.g., user defined) of iterations of site changing, testing, and evaluating is performed. In some examples, the site searching ends when the density of the stimulation sites (e.g., the number of stimulation points within an area) exceeds a specified density threshold. In some examples, the site searching ends when the number of stimulation sites with a higher rating (e.g., a "Good" rating) exceeds a threshold number.

When the one or more site search criteria are met, the determined optimum stimulation sites are anchored and the search proceeds to one or more of the next highest priority parameters after stimulation site.

Returning to the FIG. 6 at block 625, the searching proceeds by delivering neurostimulation to the determined optimum stimulation sites and varying one or more lower priority parameters according to the parameter priority. At block 630, optimum lower priority parameters are determined for the neurostimulation.

Figures 10A, 10B:
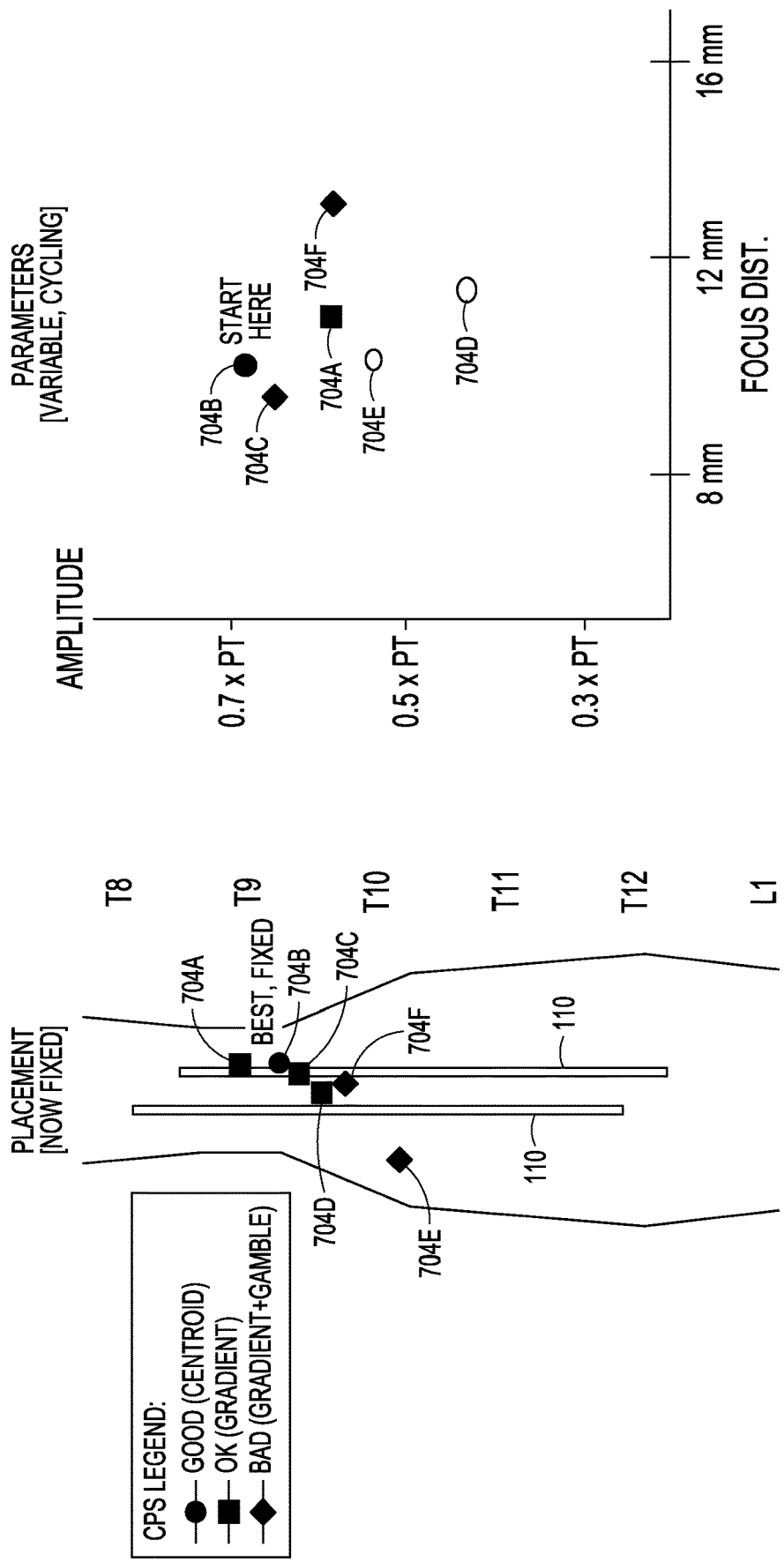
FIGS. 10A-10B illustrate an example of automatic searching and evaluating of additional neurostimulation parameters.

FIGS. 10A and 10B illustrate an example of the search scheme cycling through one or more lower priority parameters after the optimum stimulation site has been determined and fixed for the remaining testing. In FIG. 10A, stimulation site 704B is determined to be the optimum stimulation site and is used in the remainder of the testing. Searching proceeds to the parameter or parameters assigned the next highest priority. In the example of FIG. 10B, amplitude and focus distance are the next parameters tested. One or both of amplitude and focus distance are varied while other neurostimulation parameters are held constant. The parameters of the axes in the graph of FIG. 10B may be chosen by the user. The points in the graph may update every search iteration. The process continues until the parameters to be searched are tested, evaluated, and optimized.

Figure 11:
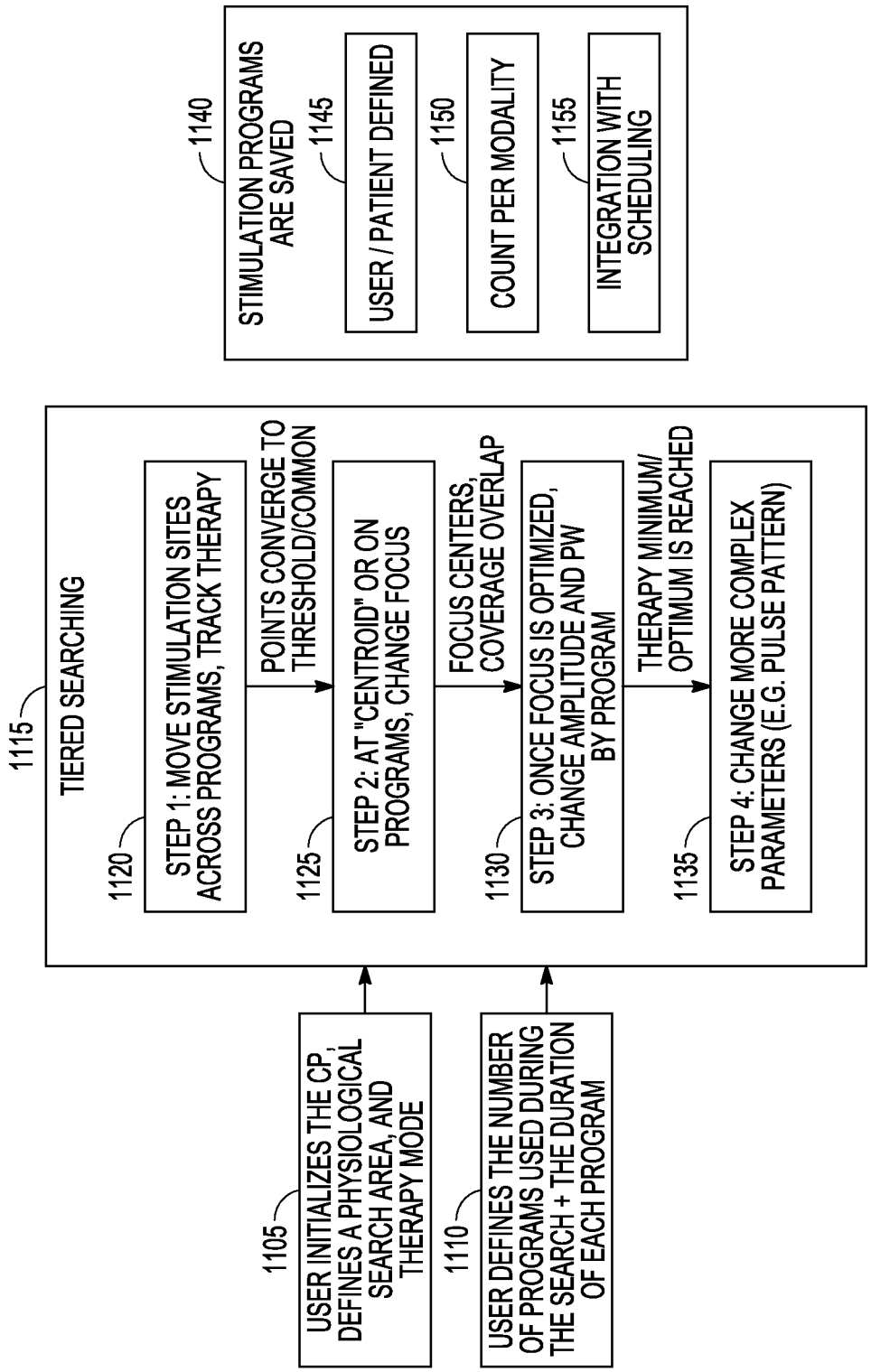
FIG. 11 is a diagram of an example of workflow for an automated search technique to find optimum neurostimulation parameters.

FIG. 11 is a diagram of an example of workflow for an automated search technique to find the best combination of neurostimulation parameters to customize neurostimulation for a patient. The searching is performed by a neurostimulation system, and the neurostimulation therapy may be delivered using the neurostimulation system. At block 1105, a user (e.g., a clinician) initializes a CP (e.g., the CP 18 in FIG. 1). Using the CP, the user defines a physiological search area. The search area may be a region of the spinal cord of the patient. In certain examples, the physiological search area is a region of the brain of the patient.

At block 1110, using the CP the user defines or selects the number of stimulation programs to search during the testing, and the user may set the time duration that each stimulation program is to be run during the testing. A stimulation program may define a stimulation site or combination of stimulation sites that are evaluated during the testing. The time duration that a program is run may be set to a default if the user does not enter a selection for the time duration.

At block 1115, the neurostimulation system carries out a tiered search to find the best combination of parameters. In the tiered search, the parameters are varied, and the parameter settings are evaluated according to priority beginning with the highest priority parameters. The priority may be a default priority, or the parameters may be prioritized by the user. Other parameters may be fixed while the parameters of the current tier are being varied and evaluated. Table 1 includes an example of setting the priority of testing the parameters. The Table may be presented to the user using a display of the CP. The user may select parameters to search, in what order the parameters are tested. The selection may be made using a user interface of the CP. Table 1 is only an example, and different parameters may be included in the Table or more parameter types may be presented in the Table.

TABLE 1

| Priority | Parameter Name | Testing Limit(s) |
|---|---|---|
| 1 | Stimulation Site | Device Limit |
| 2 | Stimulation Site Focus | 8 mm-16 mm |
| 3 | Pulse Amplitude | 0.3(PT)-0.7(PT) |
| 3 | Pulse Width | Device Limit |
| N/A | Pulse Rate | Fixed |
| N/A | Pattern Variable A | Fixed Tonic Pattern |

In the example of Table 1, six parameters are specified and only the first four are searched. The placement of the stimulation sites is selected for the highest priority (first tier of the testing). Stimulation site focus is selected for the second tier of testing. The user may select combinations of parameters for testing. In the Table, stimulation pulse amplitude and pulse width are given the same priority. Both parameters will be varied during the third tier of testing. The last two parameters of Table 1 are fixed and therefore priority doesn't apply to the last two parameters. The priority in Table 1 determines the order in which parameters are tested and evaluated. The priority in Table 1 is only one example and a user may select any priority for the parameters.

Using the CP, the user may configure limits for the parameters over which the parameter will be varied during the testing. The user may select "Device Limit," "Preconfigured," or "Fixed" for the parameter, or the user may set the limits to a custom range of parameter values. Selecting Device Limit sets the limits of the testing to the limits of what the stimulation device (e.g., an IPG) is capable of. Selecting Preconfigured may load limits run in a previous test or recommended limits for the parameter. The Preconfigured limits may be determined based on cloud data, clinical data, Mechanism of Action (MoA) knowledge, etc. Selecting Fixed sets the parameter to one value that is not varied during the testing. The Fixed value may be a default value or a value set by the user. A Fixed value stays set at that value for the duration of the testing performed.

In the example of Table 1, the Stimulation Site parameter is set to the Device Limits. The number of CPSs (Central Points of Stimulation) are unconstrained except to what the neurostimulation system is capable of testing. For example, the Device Limit may be all the CPSs that the lead electrodes are able to target. If the Stimulation Site parameter is set to Preconfigured, the stimulation sites may be determined from data (e.g., clinical data) collected for a patient population with the current patient's condition. If the Stimulation Sites are User Set, the user may drag-and-drop stimulation sites using a graphical user interface (GUI) of the CP. The GUI may provide an indicator line to guide the user to valid targets for the stimulation sites. An example of a result of selecting stimulation sites may look like the example of FIG. 7A.

Returning to FIG. 11 at block 1120, the tiered search begins with varying the stimulation site, such as described regarding FIGS. 7A, 8A, and 9A for example. In the first iteration of testing and evaluation, the neurostimulation system moves through the stimulation sites indicated for the testing according to the stimulation programs and tracks the neurostimulation therapy for evaluation. The stimulation sites are moved in the subsequent iterations of the first tier of testing. The neurostimulation therapy at each site for each iteration is evaluated using outcome metrics. Based on the evaluation, the stimulation sites are changed until the sites converge to a common centroid or to a stimulation site density threshold, such as the convergence described regarding FIGS. 7A, 8A, and 9A for example. In some examples, the stimulation site searching ends when neighboring points reach a similarity threshold in efficacy. In some examples, the searching ends after a specified number of iterations (e.g., set using the CP) are performed.

There are many different outcome metrics that can be used to evaluate the efficacy of the neurostimulation therapy. If the neurostimulation therapy involves SCS, the outcome metric may be determined using feedback from the patient. The outcome metric may be a pain score (e.g., as compared to no neurostimulation) set by the patient or determined using feedback from the patient. The outcome metric may be a patient preference rating. The outcome metric may be a percentage of the overlap of paresthesia to pain experienced by the patient. Other outcome measures can include survey responses of the patient beyond simply the pain or preference of the patient.

In some examples, the outcome metric is determined from the presence of one or more specific side effects of the neurostimulation or severity of the side effects. Some examples of such effects include one or more of motor contraction, proprioceptive sensations, paresthesia, or discomfort or pain of the patient. In certain examples, the outcome metric is the overall number of pixels covered by the stimulation. In some examples, the outcome metric is based on the presence of an evoked signal (e.g., evoked compound action potential or local field potential) due to the neurostimulation. In some examples, the outcome metric is determined using an externally measured short latency physiological signal, such as an electroencephalogram (EEG), somatosensory evoked potential (SSEP), electrocardiogram (ECG), blood pressure, or oxygen saturation (SpO2). The outcome metric may also be a more holistic patient measure such as device-determined activity level of the patient or sleep quality of the patient. The neurostimulation therapy may be evaluated using one or any combination of any of these outcome metrics described.

At block 1125 in FIG. 11, the searching proceeds to the next (second) tier of testing. The stimulation site is set to the result of the first tier and the Focus is varied over the limits of 8 millimeters (8 mm) to 16 mm. Lower priority parameters are held constant during the testing and evaluation. Focus refers to the spread between electrodes used to provide the stimulation. Changing the focus distance changes the geometry of the stimulation site.

At block 1130 in FIG. 11, the searching proceeds to the next tier of testing. When the Focus is optimized the pulse amplitude and pulse width are varied. The Stimulation Site and Focus parameters are fixed during the testing as are any lower priority parameters (if any). The pulse width is varied over the user set limits in Table 1. In the example of Table 1, the pulse amplitude specified in relative terms as a fraction of a paresthesia threshold (PT). In variations, the pulse amplitude is specified in absolute terms (e.g., as a voltage). In the example of Table 1, the pulse width is varied over the device limits. At the conclusion of the third tier of testing and evaluation, the pulse amplitude and the pulse width may be set to correspond to a minimum pulse energy that is delivered that meets the target outcome metric. In variations, the parameter related to pulse energy is an intensity index and the neurostimulation system varies the pulse amplitude/width to meet a pulse intensity.

In the example of Table 1, the pulse amplitude and the pulse width are the lowest priority parameters searched and the testing and evaluation ends. If the parameters weren't fixed testing and evaluation would continue. For instance, returning to FIG. 11 at block 1135, the testing and evaluation continues by varying more complex parameters of the neurostimulation.

An example of a more complex parameter is the pulse pattern of the neurostimulation. The pulse pattern refers to a sequence of neurostimulation pulses applied to the stimulation site. In the example of Table 1, the pulse pattern is not varied, and the pulse pattern is a tonic pattern. However, the pulse pattern can be varied by modulation of one or any combination of the pulse amplitude, the pulse width, or the pulse rate. The limits of the modulation may be user defined or set to device limits and the neurostimulation system varies the modulation of at least one of pulse amplitude, the pulse width, and the pulse rate over the indicated ranges. In some examples, the parameter may be simply turning a preconfigured pulse amplitude modulation, pulse width modulation, or pulse rate modulation either "ON" or "OFF."

If the pulse pattern is not varied and remains tonic, the efficacy of the stimulation may diminish over time. There may be an advantage to using unsynchronized stimulation of the neurons of different neuron subgroups. To affect this unsynchronized stimulation, the neurostimulation pulse pattern may contain bursts of pulses in which the burst parameters are varied. In some examples, the neurostimulation pulses can be delivered according to a random distribution statistic. The neurostimulation system delivers a pulse train in which in which one or more of pulse amplitude, pulse width, intra-burst frequency, inter-burst frequency, and stimulation duration (e.g., run time) are given a value that is selected according to the random distribution statistic. Stimulation sites may also be seeded using the random distribution statistic.

At block 1140 of FIG. 11, the neurostimulation system saves one or more of the neurostimulation programs that was evaluated. At block 1145, the neurostimulation programs that met a user or patient defined efficacy goal for the neurostimulation are saved. The efficacy goal may be defined in terms of outcome metrics. A neurostimulation program is saved if the neurostimulation program run met one or more of the outcome metrics.

At block 1150, the neurostimulation program saves the results after a number of counts or steps per modality of the optimization program has been run. The number of counts per stimulation mode completed before saving the results can be set by the user or can be a default count. At block 1155, the neurostimulation programs that are run and saved can be retrieved from memory and run again. A previously run program loaded from memory can be integrated into a set of programs scheduled to be run by a user, such as a program playlist configured by the user. The playlist identifies the neurostimulation programs to run and the sequence in which to run them. The playlist may be run in a clinical setting in the background as other patient evaluation is performed.

The devices, methods, and systems described herein are useful to customize device-based neurostimulation therapy to a patient. A neurostimulation programmable to deliver many types of neurostimulation patterns to a patient may have a large parameter search space to navigate. The embodiments described herein provide automatic streamlined searching and evaluation of the parameters to find the optimum setting for a particular patient.

Additional Disclosure

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventors also contemplate examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A machine-implemented method of controlling operation of a neurostimulation device, the method comprising:
   receiving, by the neurostimulation device, an indication of a physiological search area of a subject for delivering electrical neurostimulation and a prioritized search list of neurostimulation parameters for neurostimulation therapy delivered to the search area;
   delivering the neurostimulation therapy to the search area and varying the neurostimulation-parameters according to parameter priority of the search list, wherein a highest priority parameter is-varied first while lower priority parameters are held constant;
   determining the optimum value of the highest priority parameter;
   delivering neurostimulation in turn to multiple stimulation sites within the search area while holding other neurostimulation parameters constant;
   determining efficacy of delivered neurostimulation according to stimulation site;
   recurrently selecting one or more new stimulation sites according to efficacy of neurostimulation at a previous stimulation site;
   determining optimum stimulation sites within the search area;
   delivering neurostimulation to the search area using the determined optimum stimulation sites and varying one or more lower priority parameters according to the parameter priority; and
   determining optimum lower priority parameters for the neurostimulation.

2. The method of claim 1, wherein determining the optimum stimulation sites within the search area includes:
   moving one or more of the stimulation sites to a new site within the search area, wherein a stimulation site with lower efficacy is moved further than a stimulation site with higher efficacy is moved; and
   ending the moving of the stimulation sites when a predetermined efficacy goal for the neurostimulation is found or a predetermined number of change iterations is performed.

3. The method of claim 2, wherein moving one or more of the stimulation sites to a new site within the search area includes moving a stimulation site with lower efficacy closer to a stimulation site with higher efficacy.

4. The method of claim 2, wherein moving one or more of the stimulation sites to a new site within the search area includes moving a stimulation site with lower efficacy to a stimulation site selected randomly by the neurostimulation device.

5. The method of claim 1, wherein determining the optimum stimulation sites within the search area includes:
   recurrently changing the stimulation direction of the neurostimulation by changing electrodes of one or more multi-segmented leads used to deliver the neurostimulation;
   determining efficacy of the neurostimulation for each of the stimulation directions; and
   ending the moving of the stimulation direction when a predetermined efficacy goal for the neurostimulation is found or a predetermined number of change iterations is performed.

6. The method of claim 1, wherein varying one or more of the lower priority parameters of the neurostimulation includes:
   recurrently changing a spacing between a stimulation anode and a stimulation electrode at each of the determined optimum stimulation sites within the search area when the spacing is the highest priority remaining parameter to be varied; and
   ending the changing of the spacing when a predetermined efficacy goal for the neurostimulation is found or a predetermined number of change iterations is performed.

7. The method of claim 1, wherein varying one or more of the lower priority parameters of the neurostimulation includes:
   recurrently changing one or more of amplitude and pulse width of the neurostimulation energy when the one or more of amplitude and pulse width are the highest priority remaining parameters to be varied; and
   ending the changing of the amplitude and the pulse width when a predetermined efficacy goal for the neurostimulation is found or a predetermined number of change iterations is performed.

8. The method of claim 1, wherein varying one or more of the lower priority parameters of the neurostimulation includes recurrently changing, according to the parameter priority, one or more of time between neurostimulation pulses, number of pulses in a burst of neurostimulation pulses, and time between bursts of neurostimulation pulses.

9. The method of claim 1, wherein varying one or more of the lower priority parameters of the neurostimulation includes recurrently changing, according to the parameter priority, one or more of rate modulation, amplitude modulation, pulse width modulation at one or more of the stimulation sites.

10. The method of claim 1, wherein varying one or more of the lower priority parameters of the neurostimulation according to the parameter priority includes recurrently randomly changing one or more of time between neurostimulation pulses, number of pulses in a burst of neurostimulation pulses, time between bursts of neurostimulation pulses, rate modulation, amplitude modulation, and pulse width modulation at one or more of the stimulation sites.

11. The method of claim 1, including receiving, by the neurostimulation device, the prioritized search list of neurostimulation parameters via a user interface of the neurostimulation device.

12. The method of claim 1, wherein the determining the optimized values of the highest priority and lower priority neurostimulation parameters includes determining highest priority and lower priority neurostimulation parameters that provide sub-perception neurostimulation not perceived by the subject.

13. A neurostimulation device for electrical connection to a plurality of implantable electrodes, the neurostimulation device comprising:
   a therapy circuit configured to deliver electrical neurostimulation energy to the plurality of implantable electrodes;
   a port; and
   a control circuit operatively coupled to the therapy circuit and the port and configured to:
   receive, via the port, a selection of a physiological search area of a subject for delivering the neurostimulation energy;
   initiate delivery of the neurostimulation in turn to multiple stimulation sites within the search area while holding other neurostimulation parameters constant;
   determine efficacy of delivered neurostimulation according to stimulation site;
   recurrently select one or more new stimulation sites for neurostimulation according to efficacy of neurostimulation at a previous stimulation site;
   determine optimum stimulation sites within the search area;
   initiate delivery of the neurostimulation to the determined optimum stimulation sites while varying the other parameters of the neurostimulation energy according to a predetermined parameter priority; and
   determine optimum parameter values of the other parameters of the neurostimulation energy.

14. The neurostimulation device of claim 13, wherein the control circuit is configured to:
   change the selected multiple stimulation sites by moving one or more of the selected stimulation sites within the search area, wherein a stimulation site with lower efficacy is moved further than a stimulation site with higher efficacy is moved; and
   end the changing of the selected multiple stimulation sites when a predetermined efficacy goal for the neurostimulation is found or a predetermined number of changes iterations is performed.

15. The neurostimulation device of claim 13, wherein the control circuit is configured to vary a spacing between stimulation electrodes according to the predetermined parameter priority, including:
   recurrently change a spacing between a stimulation anode and a stimulation electrode at each of the determined optimum stimulation sites within the search area; and
   end the changing of the spacing when a predetermined efficacy goal for the neurostimulation is found or a predetermined number of change iterations is performed.

16. The neurostimulation device of claim 13, including:
   a user interface operatively coupled to the port; and
   wherein the control circuit is configured to receive, via the user interface, the predetermined parameter priority, and the predetermined number of change iterations.

17. A non-transitory computer readable storage medium including instructions that when performed by a controller circuit of a neurostimulation device, cause the neurostimulation device to perform actions including:
   receiving an indication of a physiological search area of a subject for delivering electrical neurostimulation;
   varying parameters of neurostimulation delivered to the search area according to parameter priority, wherein stimulation site has a highest parameter priority and is varied first while lower priority parameters are held constant; and
   initiating delivery of the neurostimulation within the search area, including:
   applying the neurostimulation in turn to multiple stimulation sites within the search area while holding lower priority parameters constant;
   determining efficacy of delivered neurostimulation according to stimulation site;
   recurrently selecting one or more new stimulation sites according to efficacy of neurostimulation at a previous stimulation site;
   determining optimum stimulation sites within the search area;
   initiating delivery of neurostimulation to the determined optimum stimulation sites that varies one or more lower priority parameters according to the parameter priority; and
   determining optimum lower priority parameters for the neurostimulation.

18. The non-transitory computer-readable storage medium of claim 17, including instructions that cause the neurostimulation device to recurrently apply the neurostimulation in turn to the multiple stimulation sites within the search area, including:
   determining efficacy of the neurostimulation for each of the stimulation sites;
   moving one or more of the stimulation sites to a new site within the search area, wherein a stimulation site with lower efficacy is moved further than a stimulation site with higher efficacy is moved; and
   ending the moving of the stimulation sites when a predetermined efficacy goal for the neurostimulation is found or a predetermined number of changes iterations is performed.

19. The non-transitory computer-readable storage medium of claim 18, including instructions that cause the neurostimulation device to move a stimulation site with lower determined efficacy closer to a stimulation site with higher determined efficacy.

* * * * *